United States Patent [19]

Takada

[11] 4,207,521
[45] Jun. 10, 1980

[54] SYSTEM USING CARRIER BURST SEQUENCES FOR DETECTING INTERFERENCE SIGNALS OCCURRING ACROSS CHANNELS OF A RADIO LINK INCLUDING A REPEATER

[75] Inventor: Masami Takada, Tokyo, Japan

[73] Assignee: Nippon Electric Co., Ltd., Tokyo, Japan

[21] Appl. No.: 830,628

[22] Filed: Sep. 6, 1977

[51] Int. Cl.² .............................................. H04B 1/59
[52] U.S. Cl. ....................................... 455/20; 455/50; 455/303
[58] Field of Search ................ 178/15S; 325/60, 472, 325/3, 9, 10, 11, 473, 474, 51, 52, 54, 65, 323, 324, 371, 416, 432, 433, 343, 200; 179/16, 170 A, 170 HF, 15 FE, 15 BW, 15 BS; 343/100 PE; 333/2

[56] References Cited

U.S. PATENT DOCUMENTS

| 3,735,266 | 5/1973 | Amitzy | 325/60 |
| 3,986,123 | 10/1976 | Tinno et al. | 325/56 |
| 4,090,137 | 5/1978 | Soma et al. | 325/60 |

Primary Examiner—Robert L. Griffin
Assistant Examiner—Peter Duvigon
Attorney, Agent, or Firm—Ostrolenk, Faber, Gerb & Soffen

[57] ABSTRACT

A transmitter which transmits at least first and second burst sequences, through at least first and second channels of a radio link including a different repeater in each of the respective channels, is disclosed. A carrier signal is gated into each burst sequence in time division fashion by gating signals. By the use of gating signals reproduced from received bursts, a receiver detects an interference signal introduced from at least the first channel into the second by removing from the received bursts and interference signal that difference in frequency and/or phase which is liable to occur between the first and second bursts in the repeaters. To this end, continuous signals are controlled by the received bursts and the reproduced gating signals so as to have frequencies and phases different by the difference and are used to frequency convert the received first bursts and the received interference signal into a burst and an interference component signal. For an interference signal that occurs between the receiver and the repeaters nearest thereto, it is possible to produce the component signals by the use of the reproduced gating signals and an uncontrolled continuous signal. In both cases, a burst-mode or continuous-mode reference signal is used together with the gating signal reproduced from the received first bursts to make the component signals have the same frequency and phase as the reference signal and is used to determine correlation between the received first bursts and the received interference signal.

14 Claims, 6 Drawing Figures

SYSTEM USING CARRIER BURST SEQUENCES FOR DETECTING INTERFERENCE SIGNALS OCCURRING ACROSS CHANNELS OF A RADIO LINK INCLUDING A REPEATER

BACKGROUND OF THE INVENTION

This invention relates to a system for detecting in a receiver of a radio communication link or system interference signals which are inevitably introduced into a plurality of communication signals transmitted to the receiver in a common frequency band.

In a conventional terrestrial microwave communication link, interference which occurs among communication signals carrying information signals during transmission of the communication signals in a common frequency band from a transmitting or origination station to a receiving or destination station is usually not serious because the communication signals are sufficiently separated from one another by directivity and/or polarization discrimination among antenna beams. The interference does, however, becomes serious in several instances, for example where use is made of a narrow angular directivity separation of less directivity discrimination among the antenna beams in order to more effectively use the frequencies; a case where the polarization discrimination is deteriorated by rain, and a case where use is made of a region in which scatter of the electromagnetic waves for the communication signals is serious. In these cases, it is necessary to detect the interferences in order to derive control signals for compensating for or cancelling the interference. Compensation of the interference is also necessary in a communication link comprising one or more repeater stations between the origination and the destination stations as will be exemplified hereunder with reference to one of several figures of the accompanying drawing. It is thus indispensable for compensation of the interference to detect, at a receiver of the destination or repeater station, interference signals produced during transmission of the communication signals between the origination and the destination stations. It is to be noted here that the receiver of a repeater station utilized in the disclosed system is different from an ordinary receiver in that it is unnecessary in the former to derive original information signals carried by the communication signals.

Also in a satellite communication link wherein communication signals of a common frequency band are separated from one another by polarization discrimination and repeated by a transponder carried by a satellite, cross-polarization interference is inevitable due to rain and other factors. Detection of the interference signals is again mandatory in a receiver of the transponder which serves as one or more repeater stations or of a destination ground station.

A system for detecting the interference signals produced among cross-polarized electromagnetic waves, such as a dextrorotary and a levorotary elliptically polarized wave, of a common frequency is disclosed in U.S. Pat. No. 3,735,266 issued to Noach Amitay, an assignor to Bell Telephone Laboratories, Incorporated, or in U.S. Pat. No. 4,090,137 issued to Shoji Soma and Ikuno Sato, assignors to the present assignee. Pilot carrier signals of different frequencies are transmitted as the respective cross-polarized waves. In a receiving station, the pilot carrier signals and interference signals occurring across the cross-polarized channels are detected for comparison between their respective phases or amplitudes to determine levels of the interference signals. The disclosed system is applicable in general to a communication link comprising a transmitting station and the receiving station and no repeater station although possibility of inclusion of one or more repeater stations is mentioned in the referenced U.S. Pat. No. For example, the proposed system is applicable in a satellite communication link only to a down link and not to a whole link comprising an up link and the down link. This is because frequency conversion is carried out in a repeater station.

SUMMARY OF THE INVENTION

It is therefore an object of the present invention to provide a system for producing in a receiver of a radio communication link a plurality of output signals representative of interference signals which are inevitably introduced into a plurality of communication signals transmitted to the receiver in a common frequency band from a transmitting station even through one or more repeater stations.

It is another object of this invention to provide an interference signal detection system of the type described, wherein the repeater station retransmits or repeats the communication signals to the receiver in the common frequency band with frequency conversion carried out for these repeater input communication signals independently of one another which are transmitted to the repeater station, in turn, from the transmitting station generally in another common frequency band.

A system to which this invention is applicable is for producing in a receiver of a radio communication link a plurality of detector output signals representative of at least one interference signal. The communication link comprises a transmitting station for transmitting a plurality of transmitter output signals in a first common frequency band and repeater means for receving the transmitter output signals as repeater input signals and for retransmitting the repeater input signals as repeater output signals in a second common frequency band with frequency conversion carried out between the repeater input signals and the respective repeater output signals. The receiver is capable of receiving the repeater output signals as receiver input signals. The transmitter output signals carry information signals and result in the receiver input signals, respectively. The interference signal is inevitably introduced from a first of the transmitter output signals into one of the receiver input signals that results from a second of the transmitter output signals.

According to this invention the transmitting station comprises a carrier signal generator for generating a carrier signal of a carrier frequency in the first common frequency band, gate signal generating means for generating a plurality of gate signal sequences with the gate signals of each of the sequences rendered in coincident with the gate signals of the others of the sequences, and gating means for gating the carrier signal to produce sequences of carrier signal bursts in response to the respective gate signal sequences. The carrier signal burst sequences thereby intervene the carrier signal bursts of the others of the carrier signal burst sequences. The transmitting station further comprises means for transmitting the carrier signal burst sequences at a first frequency in said first frequency band as at least a portion of the respective transmission signals. The receiver comprises gate signal reproducing means and detecting means. The gate signal reproducing means is responsive to the carier signal burst sequences received together with the interference signal at a second frequency in said frequency band as at least portions of the respective transmission signals and reproduces the gate signal sequences. The detecting means is responsive to the reproduced gate signal sequences and to the received interference signal and produces the detector output signals.

The receiver may be comprised either by a destination station of the link or by a repeater station of the link for further repeating the above-mentioned repeater output signals towards the destination station. Alternatively, the receiver may be comprised by the repeater means set forth hereinabove. The second common frequency band may be coincident with the first common frequency band. In such a case, the frequency conversion as called herein may be between first carrier signals for the respective repeater input signals and those second carrier signals for the respective repeater output signals which are equal in frequency to the first carrier signals, respectively. The carrier signal burst sequences may be transmitted along with the transmitter output signals carried by the first carrier signals.

DESCRIPTION OF THE PREFERRED EMBODIMENTS

Figure 1:
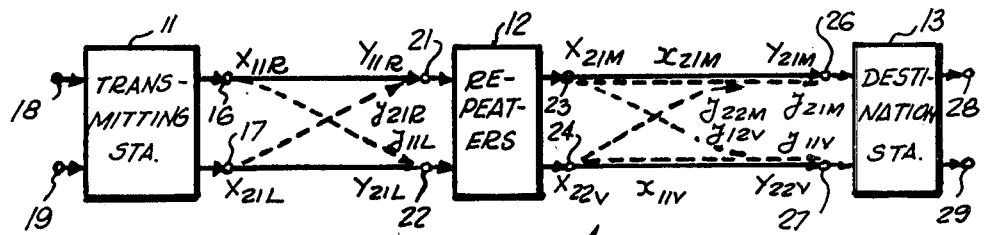
FIG. 1 is a schematic block diagram of a radio communication link in which interference signals are inevitable.

Referring to FIG. 1, a radio communication link or system to which the present invention is applicable comprises a transmitting or origination station 11, a repeater station 12, and a receiving or destination station 13. The repeater station 12 may be a transponder carried by a satellite. The transmitting station 11 comprises a pair of transmitter output terminals 16 and 17 for transmitting information signals supplied from a pair of transmitter input terminals 18 and 19, respectively, on a pair of carrier electromagnetic waves of a first common frequency band as transmitter output signals $X_{11R}$ and $X_{21L}$ or communication signals through a pair of propagation paths or communication channels. The signals $X_{11R}$ and $X_{21L}$ reach a pair of repeater input terminals 21 and 22 of the repeater station 12 as repeater input signals $Y_{11R}$ and $Y_{21L}$. During transmission, first interference signals $y_{11L}$ and $y_{21R}$ are introduced from the output signals $X_{11R}$ and $X_{21L}$ to be superposed on the repeater input signals $Y_{21L}$ and $Y_{11R}$, respectively. In general, the repeater station 12 carries out frequency conversion in addition to amplification to retransmit or repeat the input signals $Y_{11R}$ and $Y_{21L}$ through another pair of communication channels as repeater output signals $X_{12H}$ and $X_{22V}$ from a pair of repeater output terminals 23 and 24 in a second common frequency band, which may be equal to the first common frequency band. Generally, the input and output terminals 21 and 23 and the other input and output terminals 22 and 24 are of different repeaters. The interference signals $y_{11L}$ and $y_{21R}$ are repeated as frequency converted or repeated interference signals $x_{11V}$ and $x_{21H}$ superposed on the repeater output signals $X_{22V}$ and $X_{12H}$, respectively. The repeater output signals $X_{12H}$ and $X_{22V}$ reach a pair of receiver input terminals 26 and 27 of the receiving station 13 as receiver input signals $Y_{12H}$ and $Y_{22V}$. From the receiver input signals $Y_{12H}$ and $Y_{22V}$, the receiving station 13 reproduces the original information signals to deliver the same to a pair of receiver output terminals 28 and 29. The repeated interference signals $x_{11V}$ and $x_{21H}$ reach the receiver input terminals 27 and 26, respectively, as second interference signals $y_{11V}$ and $y_{21H}$ superposed or the respective receiver input signals $Y_{22V}$ and $Y_{12H}$. Furthermore, third interference signals $y_{12V}$ and $y_{22H}$ are produced, during transmission, from the repeater output signals $X_{12H}$ and $X_{22V}$ to be superposed on the receiver input signals $Y_{22V}$ and $Y_{12H}$, respectively. In the example being illustrated, polarization discrimination is carried out between the transmitter output signals $X_{11R}$ and $X_{21L}$ by a dextrorotary and a levorotary elliptically polarized carrier electromagnetic wave or signal as symbolized in the suffixes by letters R and L while by a horizontally and a vertically linearly polarized wave between the repeater output signals $X_{12H}$ and $X_{22V}$ as indicated by letters H and V in the suffixes. It will be understood in such a case that the frequency conversion as named herein may be between various cross-polarized modes of the carrier waves of a common carrier frequency.

Further referring to FIG. 1, the receiver input signal $Y_{12H}$ and the third interference signal $y_{12V}$ superposed on the other receiver input signal $Y_{22V}$ result from a common repeater output signal $X_{12H}$ and are correlated to each other. It must therefore be possible to detect the third interference signals $y_{12V}$ and $y_{22H}$ by using the correlations from the receiver input signals $Y_{12H}$ and $Y_{22V}$ received through the other propagation channels, respectively. The receiver input signal $Y_{12H}$ and the second interference signal $y_{11V}$ superposed on the other receiver input signal $Y_{22V}$ are produced in the repeater station 12 from a common transmitter output signal $X_{11R}$ and are again correlated in principle to each other. The correlation between the latter signals $Y_{12H}$ and $y_{11V}$, however, is lost in practice when the frequency conversion is carried out independently of each other for the repeater input signals $Y_{11R}$ and $Y_{21L}$ and accordingly for the repeater input signal $Y_{11R}$ and the first interference signal $y_{11L}$ which eventually result in the receiver input signal $Y_{12H}$ and the second interference signal $y_{11V}$, respectively. Under the circumstances, it is infeasible to readily detect in the receiving station 13 the second interference signals $y_{11V}$ and $y_{21H}$ from the receiver input signals $Y_{12H}$ and $Y_{22V}$ received through the other communication channels. Furthermore, it is hardly possible to separate from one another the second and third interference signals $y_{11V}$ and $y_{12V}$ and the receiver input signal $Y_{22V}$ reaching the receiver input terminal 27 in a common frequency band and in a common mode of polarization to detect degree of correlation between these interference signals $y_{11V}$ and $y_{12V}$ from the receiver input signal $Y_{12H}$ reaching the other receiver input terminal 26. This applies also to the interference signals $y_{21H}$ and $y_{22H}$. As a result, it is impossible to obtain in such a link the control information or signals for compensating the interference signals $y_{21H}$ or $y_{22H}$ and $y_{11V}$ or $y_{12V}$ from the receiver input signals $Y_{22V}$ and $Y_{12H}$, respectively.

Figure 3:
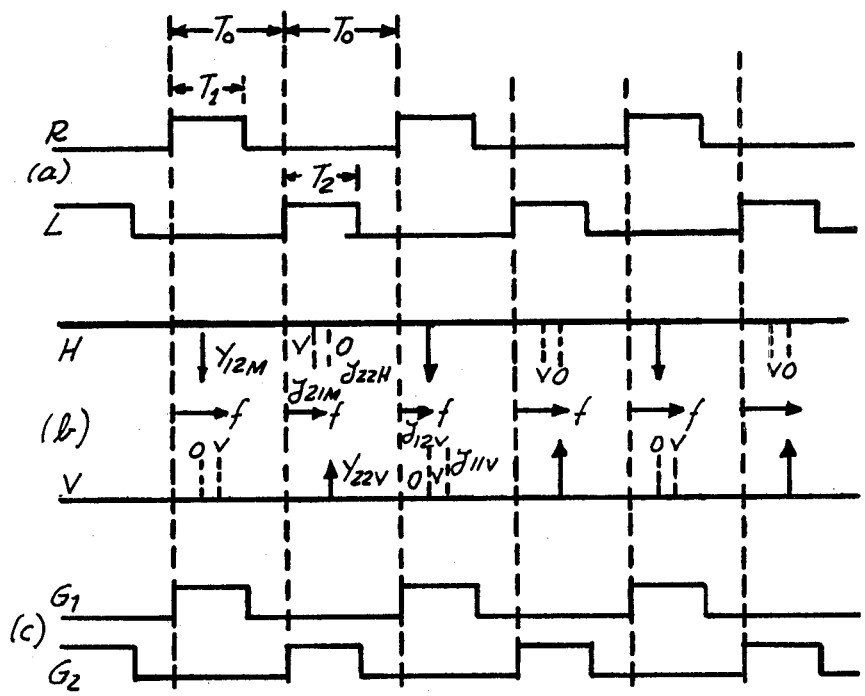
FIG. 3 schematically shows signals transmitted and received in the system according to the preferred embodiment.
Figure 2:
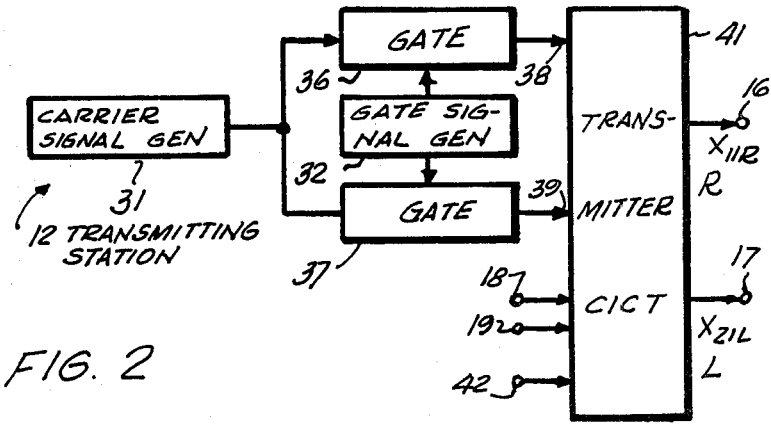
FIG. 2 is a block diagram of a transmitting station comprising a portion of a system for detecting the interference signals according to a preferred embodiment of the present invention.

Referring now to FIGS. 2 and 3, a transmitting station 11 of a radio communication link of the type exemplified with reference to FIG. 1 comprises transmitter output terminals 16 and 17, transmitter input terminals 18 and 19 for information signals, and a carrier signal generator 31 for generating a carrier signal of a carrier frequency in the above-mentioned first common frequency band. For use in an interference signal detecting system according to a preferred embodiment of this invention, the transmitting station 11 further comprises a gate signal generator 32 for generating a pair of sequences of gate signals of a common repetition period $T_0$ (FIG. 3) and a pair of gates 36 and 37 enabled by the respective gate signal sequences to allow passage therethrough of the carrier signal. Sequences of carrier signal bursts are thus alternatingly delivered from the respective gates 36 and 37 to a pair of feeder terminals 38 and 39. The transmitting station 11 still further comprises a known transmitter circuit 41 for modulating carriers of the first common frequency band by the information signals and duplexing the modulated carriers. The transmitter circuit 41 further polarizes the carrier signal bursts supplied thereto through the feeder terminals 38 and 39 into cross-polarized carrier signal bursts to deliver cross-polarized carrier signal burst sequences R and L (FIG. 3(a)) to the transmitter output terminals 16 and 17, from which the carrier signal burst sequences R and L are sent towards a repeater station 12 together with the transmitter output signals $X_{11R}$ and $X_{21L}$ mentioned hereinabove and subsequently to a receiving station 13. The carrier signal bursts have durations $T_1$ and $T_2$ which are never superposed on each other and which may not necessarily be equal to each other. The carrier signal burst sequences R and L are thus transmitted throughout the link in a time division fashion. The carrier signal generator 31 may produce the carrier signal of a frequency lower than the first common frequency band. In this event, a pair of frequency converters (not shown) fed from a common local oscillator (not shown, either) are interposed between the gate 36 and the feeder terminal 38 and between the other gate 37 and the other feeder terminal 39, respectively. According to the preferred embodiment, the transmitter circuit 41 has a control terminal 42 for control signals fed back thereto to pre-compensate the first interference signals $y_{11L}$ and $y_{21R}$ in a manner described later. It is to be noted here that each pair of the transmitter output terminals 16 and 17, receiver input or output terminals 21 and 22 or 23 and 24, and receiver input terminals 26 and 27 may be an antenna fed by the cross-polarized signals.

Further referring to FIG. 3, let it be assumed that the carrier signal bursts R and L are transmitted as the transmitter output signals $X_{11R}$ and $X_{21L}$ and eventually reach the receiver input terminals 26 and 27 as the receiver input signals $Y_{12H}$ and $Y_{22V}$ through the repeater station 12. The carrier signal burst sequences R and L reach the receiver input terminals 26 and 27 with durations represented by thick horizontal lines in FIG. 3(b) in every other repetition period $T_0$ drawn along lines H and V, respectively. The above-mentioned second and third interference signals $y_{21H}$ and $y_{22H}$ appear with durations indicated also by thick horizontal lines along the line H in the periods $T_0$ in which the receiver input signal $Y_{12H}$ accompanied thereby does not appear. Likewise, the other receiver input signal $Y_{22V}$ and the accompanying second and third interference signals $y_{11V}$ and $y_{22V}$ appear in different periods $T_0$. With frequency axes f set in the respective periods $T_0$, the carrier frequencies of the receiver input signals $Y_{12H}$ and $Y_{22V}$ are as exemplified by solid lines vertically drawn to the thick horizontal lines representative of the durations of the respective signals. These carrier frequencies are somewhat different from each other in the common frequency band as a result of the independent frequency conversion for the repeater input signals $Y_{11R}$ and $Y_{21L}$. For convenience of further description, the differences in frequency between the repeater input signals $Y_{11R}$ and $Y_{21L}$ and the respective repeater output signals $X_{12H}$ and $Y_{22V}$ are called first and second conversion differences and denoted by $F_{s1}$ and $F_{s2}$. In general, these differences have a frequency and/or phase difference $F_{s1} \sim F_{s2}$ therebetween. The carrier frequencies of the third interference signals $y_{22H}$ and $y_{12V}$ superposed on the receiver input signals $Y_{12H}$ and $Y_{22V}$ are equal to the carrier frequencies of the other receiver input signals $Y_{22V}$ and $Y_{12H}$, respectively, as indicated by broken lines drawn vertically to the thick lines representative of the durations of the respective interference signals and labelled "O". When the transmitter output signals $X_{11R}$ and $X_{21L}$ are derived from a common carrier generator as assumed hereinabove, the carrier frequencies of the second interference signals $y_{21H}$ and $y_{11V}$ superposed on the receiver input signals $Y_{12H}$ and $Y_{22V}$ are equal to the carrier frequencies of the respective receiver input signals $Y_{12H}$ and $Y_{22V}$ as shown also by similar broken lines labelled "V". The difference between the frequencies "O" and "V" is equal to the absolute value of the frequency and/or phase differences $F_{s1} \sim F_{s2}$.

Referring to FIG. 3 again and to FIG. 4 afresh, the receiving station 13 comprises the already-mentioned receiver input terminals 26 and 27 and receiver output terminals 28 and 29 and a known receiver circuit 46 having a control terminal 47 for control signals fed back thereto to compensate the second and third interference signals $y_{11V}$, $y_{21H}$, $y_{12V}$, and $y_{22H}$ in a manner described below. The receiver circuit 46 processs the receiver input signals $Y_{12H}$ and $Y_{22V}$ and the accompanying interference signals $y_{21H}$, $y_{22H}$, $y_{11V}$, and $y_{12V}$ to deliver the thereby reproduced original information signals to the receiver output terminals 28 and 29 and thereby derived first and second high-frequency signals $S_1$ and $S_2$ to high-frequency output terminals 48 and 49. Frequencies of the high-frequency signals may be set, for example, between 200 MHz and 800 MHz. Under the assumed circumstances, the first high-frequency signal $S_1$ has components of the received carrier signal burst sequence has the receiver input signal $Y_{12H}$ and of the second and third interference signals $y_{21H}$ and $y_{22H}$, while the second one $S_2$, components of the other received carrier burst sequence V as the other receiver input signal $Y_{22V}$ and of the other second and third interference signals $y_{11V}$ and $y_{12V}$. For use in the interference signal detecting system according to the preferred embodiment, the receiving station 13 further comprises a gate signal reproducing and phase-frequency difference detecting circuit 51 responsive to the high-frequency signals $S_1$ and $S_2$ for reproducing first and second gate signal sequences G$_1$ and G$_2$ (FIG. 3(c)) and for detecting the frequency and/or phase difference F$_{s1}$ ~ F$_{s2}$. The reproduced gate signals G$_1$ and G$_2$ define the respective durations T$_1$ and T$_2$. Responsive to the high-frequency signals S$_1$ and S$_2$, the reproduced gate signal sequences G$_1$ and G$_2$, and signals representative of the frequency and/or phase difference F$_{s1}$ ~ F$_{s2}$, an interference signal detector 52 removes the frequency and/or phase difference F$_{s1}$ ~ F$_{2s}$ from the signals received at the receiver input terminals 26 and 27 and determines the degree of correlation in amplitude and phase between the second interference signal y$_{11V}$ and the receiver input signal Y$_{12H}$ and between the other sequence interference signal y$_{21H}$ and the other receiver input signal Y$_{22V}$ and delivers control signals representative of the degrees of correlation to control signal output terminals 56, 57, 58, and 59. The interference signal detector 52 can also determine the degree of correlation in amplitude and phase between the third interference signal y$_{12V}$ and y$_{22H}$ superposed on the receiver input signal Y$_{22V}$ and Y$_{12H}$ and the other receiver input signals Y$_{12H}$ and Y$_{22V}$, respectively.

Figure 4:
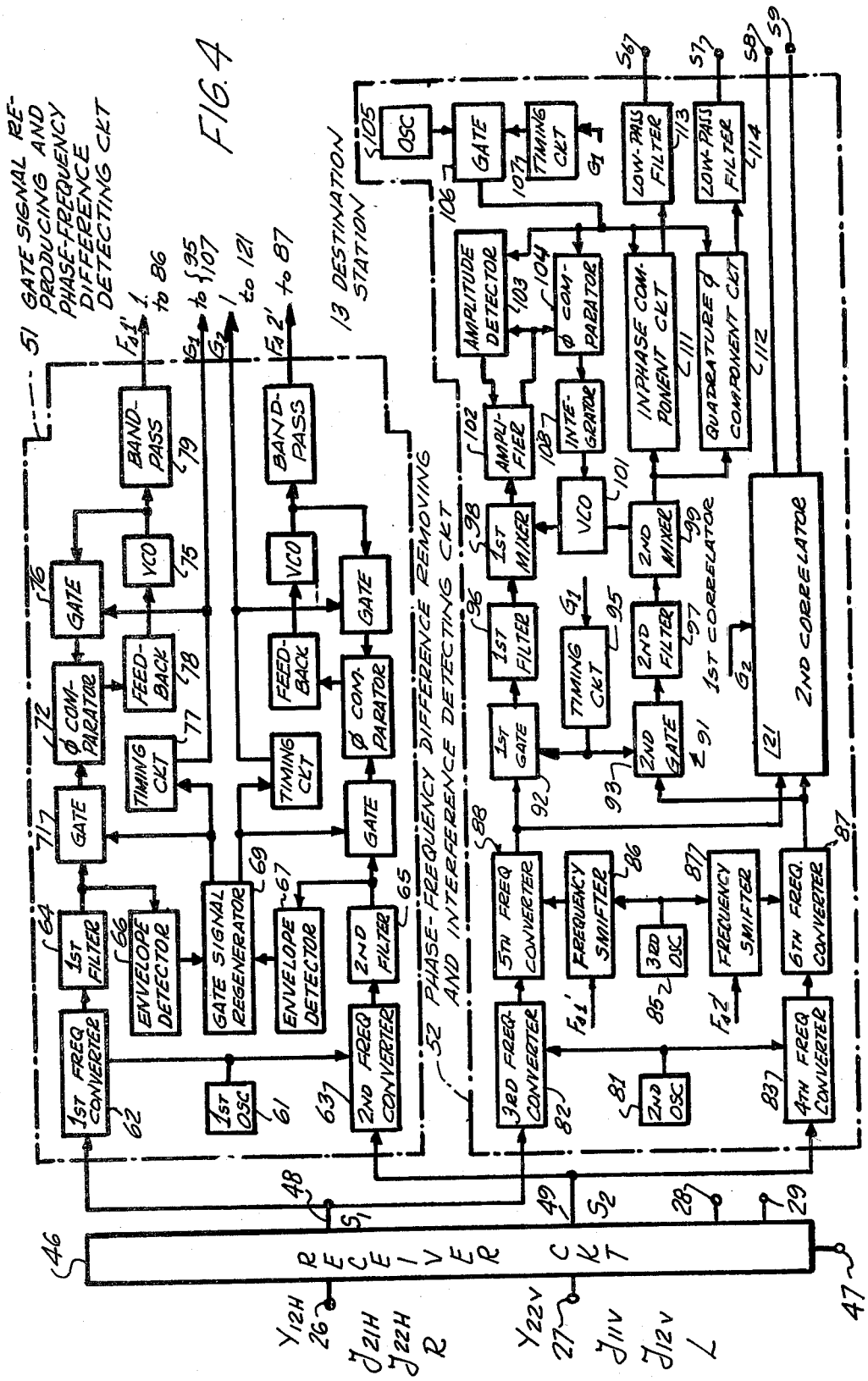
FIG. 4 is a block diagram of a destination station comprising another portion of the system according to the preferred embodiment.

Referring more particularly to FIG. 4, the gate signal reproducing and phase-frequency difference detecting circuit 51 comprises a first local oscillator 61 for producing a first local signal of a first local frequency, first and second frequency converters 62 and 63 supplied with the local signal to convert the first and second high-frequency signals S$_1$ and S$_2$ to first and second intermediate frequency signals, first and second filters 64 and 65 for the respective intermediate frequency signals, and first and second envelope detectors 66 and 67 for envelope detecting the respective filtered intermediate frequency signals to control a gate signal regenerator 69 for producing the first and second reproduced gate signal sequences G$_1$ and G$_2$. Frequencies of the first and second intermediate frequency signals may be selected, for example, between 10 MHz and 100 MHz. The first reproduced gate signals G$_1$ are supplied to an intermediate frequency signal gate 7 to enable the same only during the durations T$_1$ (FIG. 3(a) and (c)) and thereby to allow passage therethrough of only those components of the first filtered intermediate frequency signal which correspond to the carrier signal bursts H and which are supplied to a phase comparator 72. A voltage-controlled oscillator 75 produces a phase-frequency difference signal approximately equal in frequency to the first and second intermediate frequency signals and supplies the same to a difference signal gate 76. The first reproduced gate signals G$_1$ are supplied to the gate 76 through a timing circuit 77. The phase comparator 72 thus produces a phase difference signal to supply the same to the voltage-controlled oscillator 75 though a feedback path 78 having a predetermined time constant and to control the frequency of the local frequency conversion difference signal. The timing circuit 77 is for keeping the correct timing between the intermediate frequency signal bursts and the gated phase-frequency difference signal, which signals are supplied to the phase comparator 72. The phase comparator 72 and associated circuitry thus serve as an automatic phase control loop for the voltage-controlled oscillator 75 to make a narrow band-pass filter 79 produce a first continuous mode signal F$_{s1}$'. The circuit 51 further comprises similar elements responsive to the second filtered intermediate frequency signal and the second reproduced gate signals G$_2$ for producing a second continuous mode signal F$_{s2}$'. The frequency and/or phase difference between the first and second continuous mode signals F$_{s1}$' and F$_{s2}$' is equal to the above-mentioned frequency and/or phase difference F$_{s1}$ ~ F$_{s2}$.

Further referring to FIG. 4, the interference signal detector 52 comprises a second local oscillator 81 for producing a second local signal of a second local frequency, third and fourth frequency converters 82 and 83 responsive to the second local signal for converting the first and second high-frequency signals S$_1$ and S$_2$ to third and fourth intermediate frequency signals, a third local oscillator 85 for producing a third local signal of a third local frequency, first and second frequency shifters 86 and 87 for shifting the frequencies of the first and second continuous mode signals F$_{s1}$' and F$_{s2}$' to first and second intermedifrequency difference signals, and fifth and sixth frequency converters 88 and 89 responsive to the respective intermediate frequency difference signals for removing the frequency and/or phase difference F$_{s1}$ ~ F$_{s2}$ from the third and fourth intermediate frequency signals to derive first and second common frequency signals. Preferably, the third and fourth intermediate frequency signals are of frequencies a little higher than the first and second intermediate frequency signals. For example, the frequencies of the third and fourth intermediate frequency signals are of the order of 11 MHz when the frequencies of the first and second intermediate frequency signals are about 9 MHz. Under the circumstances, the common frequency of the first and second common frequency signals is approximately 2 MHz. The detector 52 further comprises a first correlator 91 comprising, in turn, first and second gates 92 and 93 supplied with the first and second common frequency signals and also with the first reproduced gate signals G$_1$ through a timing circuit 95 for keeping correct timing between the timed gate signals and the durations T$_1$ (FIG. 3(a)). The gates 92 and 93 are enabled only during the intervals in which the first common frequency signal has components of the carrier signal bursts H and in which the second common frequency signal has components of the second and third interference signals y$_{11V}$ and y$_{12V}$. First and second filters 96 and 97 include both filter and amplifier circuits and serve to both filter and amplify the outputs of gates 92, 93, for the common frequency respectively. The filtered common frequency signals having components of the bursts H and the second interference signal y$_{11V}$, respectively, are supplied to first and second mixers 98 and 99 which are also supplied with a voltage-controlled oscillation signal from a voltage-controlled oscillator 101 to produce a burst carrying signal and an interference carrying signal, respectively, of a frequency of the order of several hundreds of kilohertz.

Still further referring to FIG. 4, the interference signal detector 52 comprises a gain-adjustable amplifier 102 for amplifying the burst carrying signal, an amplitude detector 103, a phase comparator 104 supplied with the amplified burst carrying signal, a stable oscillator 105 for stably producing a signal of a fixed frequency equal to the frequency of the burst and interference carrying signals, and a fixed frequency signal gate 106 for gating the fixed frequency signal in response to the first reproduced gate signals G$_1$ supplied thereto through a timing circuit 107. The gated fixed frequency signal is supplied to the phase comparator 104 as a reference signal with which the comparator 104 compares the amplified burst carrying signal to control the voltage-controlled oscillator 101 through an integrator 108. The timing circuit 107 is for keeping correct timing between the reference signal and the amplified burst carrying signal. The reference signal is supplied also to the amplitude detector 103 together with the amplified burst carrying signal to control the adjustable gain of the amplifier 102. By this arrangement, the burst carrying signal produced by the first mixer 98 is automatically phase-synchronized with the fixed frequency signal. The relation between the reference or gated fixed frequency signal and the interference carrying signal is equivalent to the relation between that receiver input signal $Y_{12H}$ and that second interference signal $y_{11V}$ superposed on the other receiver input signal $Y_{22V}$, from which the first and second conversion differences $F_{s1}$ and $F_{s2}$ are removed, respectively. The detector 52 further comprises circuits 111 and 112 responsive to the reference signal for deriving the inphase and the quadrature phase components of the interference carrying signal, respectively, and low-pass phase components. It is thus possible to supply the control signal output terminals 56–57 of the first correlator 91 with the control signals representative of the degree of correlation between the receiver input signal $Y_{12H}$ and the second interference signal $y_{11V}$.

Referring to FIG. 4 once again, a second correlator 121 of the interference signal detector 52 is similar in structure to the first correlator 91. Supplied with the first and second common frequency signal and the second reproduced gate signals $G_2$, the second correlator 121 supplies the control output terminals 58 and 59 thereof with the control signals representative of the degree of correlation in amplitude and phase, respectively, between the receiver input signal $Y_{22V}$ and the second interference signal $y_{21H}$ superposed on the other receiver input signal $Y_{12H}$. The control signals are fed back from the output terminals 56 through 59 to the control terminal 42 of the transmitter high-frequency circuit 41.

Figure 5:
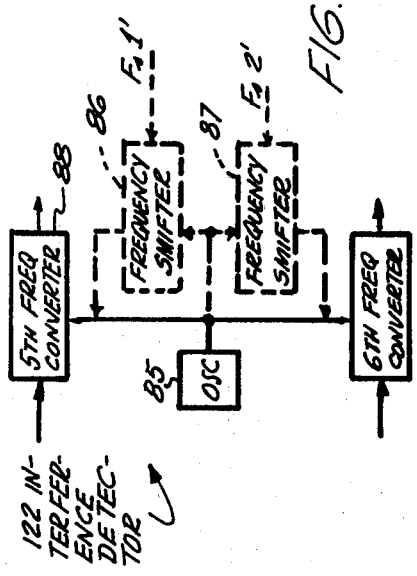
FIG. 5 is a block diagram of a portion of an interference detector applicable to the destination station shown in FIG. 4.

Turning to FIG. 5, an interference signal detector 122 for producing a set of interference detection signals representative of the inphase and the quadrature phase components of the third interference signal $y_{12V}$ received at the receiver input terminal 27 relative to the receiver input signal $Y_{12H}$ received at the other receiver input terminal 26 and another set of interference detection signals representative of similar components of the other third interference signal $y_{22H}$ relative to the other receiver input signal $Y_{22V}$ differs from the interference signal detector 52 described with reference to FIG. 4 in that the detector 122 need not comprise the frequency shifters 86 and 87, which are shown by broken lines for reference. The detection signals obtained at control output terminals corresponding to the terminals 56 through 59 are fed back to the control terminal 47 of the receiver circuit 46 to cancel the third interference signals $y_{12V}$ and $y_{22H}$ from the receiver input signals $Y_{22V}$ and $Y_{12H}$, respectively. It is possible to switch the phase shifters 86 and 87 in and out of by a manually operable switch device (not shown).

Figure 6:
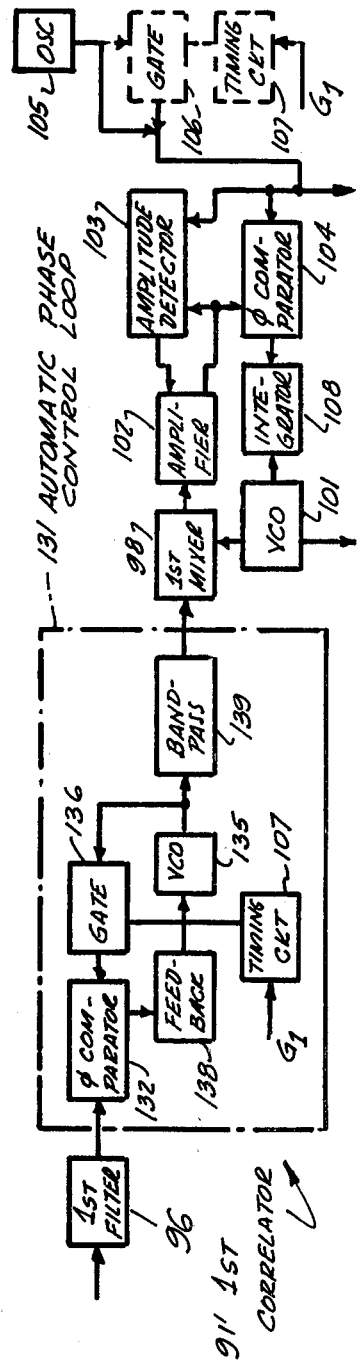
FIG. 6 is a block diagram of a correlator applicable to the destination station illustrated in FIG. 4.

Referring to FIG. 6, a first correlator 91' is for use instead of the correlator 91 described in conjunction with FIG. 4 in producing the interference detection signals representative of the inphase and the quadrature phase components of the second interference signal $y_{11V}$ received at the receiver input terminal 27 relative to the receiver input signal $Y_{12H}$ reaching the other receiver input terminal 26. In contrast to the correlator 91 controlled by the first reproduced gate signals $G_1$ to operate in a burst mode, the correlator 91' operates in a continuous mode. The correlator 91' therefore does not comprise the fixed frequency signal gate 106 as indicated by a broken-line block for reference. Instead, the correlator 91' comprises between the first filter 96 for providing that component of the first common frequency signal having components of the carrier signal bursts H and the first mixer 98 a first automatic phase control loop 131 similar to the loop used in the phase-frequency difference detector 51. More specifically, the above-mentioned component is supplied to a phase comparator 132. A voltage-controlled oscillator 135 produces a voltage-controlled signal of a frequency approximately equal to the common frequency described hereinabove. A gate 136 is enabled by the first reproduced gate signals $G_1$ supplied thereto through the timing circuit 107 to supply the voltage-controlled signal to the phase comparator 132. The phase comparator 132 produces a phase difference signal and supplies the same to the voltage-controlled oscillator 135 through an integrating feedback circuit 138. The voltage-controlled signal is thus phase-controlled and supplied to the first mixer 98 through a narrow band-pass filter 139. The correlator 91' further comprises a second automatic phase control loop (not shown) between the second filter 97 and the second mixer 99. It may be recalled here that the second filter 97 produces that component of the second common frequency signal which corresponds to the second interference signal $y_{11V}$ in the interference signal detector 52 or to the third interference signal $y_{12V}$ in the interference signal detector 122.

When equipped with an interference signal detection system according to this invention, a terrestrial or a satellite communication link is operable in various manners. For example, it is possible to transmit only the carrier signal burst sequences R and L as the transmitter output signals $X_{11R}$ and $X_{21L}$ per se on detecting the interference. Alternatively, it is possible to detect the interference with only one of the repeaters of the repeater station or stations, such as 12, put into operation and to thereby simplify the gate signal reproducing and phase-frequency difference circuit 51 and the interference detector 52. If the repeater having the input and output terminals 22 and 24 is put out of operation on detecting the interference, only one each of the second and third interference signals $y_{21H}$ and $y_{12V}$ reach the receiver input terminals 26 and 27, respectively. The interference produced between the transmitting station 11 and the repeater station 12, for example, in an up link of a satellite communication link, is detected by the correlation between the second interference signal $y_{21H}$ and the receiver input signal $Y_{12H}$ reaching the same receiver input terminal 26. Although the receiver input signal $Y_{12H}$ and the interference signal $y_{21H}$ are of the same frequency, the carrier signal bursts H and the interference signal $y_{21H}$ occur in different repetition periods $T_0$. It is therefore possible to discriminate between the bursts H and the interference signal $y_{21H}$ without using the unnumbered circuit elements of the gate signal reproducing and phase-frequency difference detecting circuit 51. The interference produced between the repeater station 12 and the destination station 13 is detected by the correlation between the receiver input signal $Y_{12H}$ and the third interference signal $y_{12V}$. Inasmuch as these signals $Y_{12H}$ and $y_{12V}$ are received through different communication channels, it is possible to discriminate between the signals $Y_{12H}$ and $y_{12V}$ without using the second correlator 121.

It is possible to apply a system according to this invention to various communication systems. In frequency modulation-frequency division multiplex (FM-FDM) satellite communication, it is possible to provide the above-described carrier signal burst sequences, such as R and L, by using in a time division fashion one of the pilot frequencies sent from ground stations or repeated from a satellite. In time division multiple access (TDMA) of satellite communication, transponder hopping as called in the art is known wherein repeaters for different carriers carry out the frame synchronism as well as the burst synchronism. Under the circumstances, each of the burst signals is preceded by a preliminary signal code for use in reproducing the carrier and in keeping the timed relations. It is possible according to this invention to use the preceding codes of the respective TDMA signals as the above-mentioned carrier signal bursts. Inasmuch as the intervals given by $T_0$–$T_1$ and $T_0$–$T_2$ in FIG. 3 are considerably long, it is possible to send data codes during these intervals. In a SPADE system or a single channel per carrier (SCPC) system, use is possible as the afore-mentioned durations, such as $T_1$ and $T_2$, for the carrier signal bursts of those intervals which do not include data codes and are used to keep synchronism.

As thus far been described, this invention makes it possible to detect the interference by using carrier signal bursts generated and transmitted in a time division fashion. This serves to reduce the frequencies and the electric power for detection of the interference when compared with similar conventional systems wherein use is made of continuous pilot carrier signals of additional frequencies. Incidentally, it would have been already appreciated that the number of the carrier signal burst sequences may be three or more according to the number of communication channels across which the interference is liable to occur.

What is claimed is:

1. In a system for producing in a receiver of a radio communication link a plurality of detector output signals representative of at least one interference signal, said communication link comprising a transmitting station and repeater means for transmitting transmission signals through a plurality of transmission channels, said transmitting station transmittng said transmission signals in a first frequency band, said repeater means subjecting said transmission signals to frequency conversion from said first frequency band to a second frequency band, said receiver receiving said transmission signals in said second frequency band as a result of said frequency conversion, said interference signal being inevitably introduced from one of said transmission channels into another of said transmission channels, the improvement wherein said transmitting station comprises:

a carrier signal generator for generating a carrier signal;

gate signal generating means for generating a plurality of gate signal sequences with the gate signals of each of said sequences rendered incoincident in time with the gate signals of the others of said sequences;

gating means for gating said carrier signal to produce sequences of carrier signal bursts in response to the respective gate signal sequences, the carrier signal bursts of each of said carrier signal burst sequences thereby intervening the carrier signal bursts of the others of said carrier signal burst sequences; and means for transmitting the carrier signal burst sequences at a first frequency in said first frequency band as at least portions of the respective transmission signals;

said receiver comprising:

gate signal reproducing means responsive to the carrier signal burst sequences received, together with the interference signal, at a second frequency in said second frequency band as at least portions of the respective transmission signals for reproducing said gate signal sequences; and detecting means responsive to the reproduced gate signal sequences and the received interference signal for producing said detector output signals.

2. A transmitting station for use in a system for producing in a receiver of a radio communication link a plurality of detector output signals representative of at least one interference signal, said transmitting station being comprised by said communication link together with repeater means, said transmitting station transmitting transmission signals in a first frequency band, said repeater means repeating said transmisson signals by subjecting said transmission signals to frequency conversion from said first frequency band to a second frequency band, said receiver receiving said transmission signals from said repeater means, said transmission signals being thus transmitted from said transmitting station to said repeater means and from said repeater means to said receiver through a plurality of transmission channels, said interference signal being inevitably introduced from a first of said transmission channels to a second of said transmission channels, wherein the improvement comprises:

a carrier signal generator for generating a carrier signal;

gate signal generating means for generating a plurality of gate signal sequences with the gate signals of each of said sequences rendered incoincident in time with the gate signals of the others of said sequences;

gating means for gating said carrier signal to produce carrier signal burst sequences in response to the respective gate signal sequences, the carrier signal bursts of each of said carrier signal burst sequences thereby intervening the carrier signal bursts of the others of said carrier signal burst sequences; and means for transmitting said carrier signal burst sequences at a frequency in said first frequency band as at least portions of the respective transmission signals.

3. A receiver for use in a system for producing a plurality of detector output signals representative of at least one interference signal, said receiver being comprised by a radio communication link together with a transmitting station and repeater means, said transmitting station transmitting transmission signals in a first frequency band, said repeater means repeating said transmission signals by subjecting said transmission signals to frequency conversion from said first frequency band to a second frequency band, said receiver receiving said transmission signals from said repeater means and said interference signal, said transmission signals being thus transmitted from said transmitting station to said repeater means and from said repeater means to said receiver through a plurality of transmission channels, said interference signal being inevitably introduced from a first of said transmission channels to a second of said transmission channels, said transmitting station comprising means for generating a carrier signal, means for generating a plurality of gate signal sequences with the gate signals of each of said sequences rendered incoincident in time with the gate signals of the others of said sequences, means for gating said carrier signal to produce carrier signal burst sequences in response to the respective gate signal sequences so that the carrier signal bursts of each of said carrier signal burst sequences intervene the carrier signal bursts of the others of said carrier signal burst sequences, and means for transmitting said carrier signal burst sequences at a first frequency in said first frequency band, said repeater means converting the frequency of a first and a second of said carrier signal burst sequences transmitted through said first and second transmission channels, respectively, to a second frequency in said second frequency band and being liable to convert the frequency of one of said first and second carrier signal burst sequences to a third frequency in said second frequency band rather than to said second frequency, said second and third frequencies having a difference therebetween in at least one of frequency and phase, said receiver receiving said first and second carrier signal burst sequences as at least portions of a first and a second of said transmission signals transmitted through said first and second transmission channels, respectively, wherein the improvement comprises:

gate signal reproducing means responsive to the received first and second transmission signals for reproducing a first and a second of the gate signal sequences in response to which said first and second carrier signal burst sequences are produced in said transmitting station, respectively; and detector output signal producing means responsive to said received first and second transmission signals, the received interference signal, and the reproduced gate signal sequences for producing said detector output signals.

4. A receiver as claimed in claim 3, wherein said detector output signal producing means comprises:

component signal producing means responsive to said received first and second transmission signals, said received interference signal, and said reproduced gate signal sequences for producing a burst component signal resulting from the received first carrier signal burst sequence and an interference component signal resulting from said received interference signal, said component signals being equal in frequency and phase to each other; and correlator means responsive to said component signals for determining correlation between said received first carrier signal burst sequence and said received interference signal to produce signals representative of said correlation as said detector output signals.

5. A receiver as claimed in claim 4, said interference signal reaching said receiver through said repeater means, wherein said gate signal reproducing means comprises:

means responsive to said received first and second transmission signals for producing first and second components corresponding to the received first and second carrier signal burst sequences, respectively, and being different by said difference in said at least one of the frequency and phase; and means responsive to said first and second components for reproducing said reproduced gate signal sequences.

6. A receiver as claimed in claim 5, wherein said component signal producing means comprises:

oscillators for generating oscillation signals of controllable frequencies approximately equal to the respective frequencies of said first and second components and of controllable phases;

automatic phase control loops responsive to said reproduced gate signal sequences for controlling the frequencies and phases of said oscillation signals to provide with said oscillation signals a first and a second continuous mode signal having said difference therebetween;

burst and interference component producing means responsive to said received first and second transmission signals, said received interference signal, said continuous mode signals, and the reproduced first gate signal sequence for producing burst components and interference components corrsponding to said received first carrier signal burst sequence and said received interference signal, respectively, and being of a substantially common frequency; and control means responsive to said reproduced first gate signal sequence for controlling in frequency and phase said burst components and said interference components to produce said burst and said interference component signals.

7. A receiver as claimed in claim 6, wherein said burst and interference component producing means comprises:

means for frequency converting said received first and second transmission signals and said received interference signal by the use of said first and second continuous mode signals to produce in burst mode converted transmission signals and a converted interference signal, respectively, said converted transmission signals and said converted interference signal being of said substantially common frequency; and means responsive to said reproduced first gate signal sequence and said converted transmission and interference signals for producing said burst components and said interference components.

8. A receiver as claimed in claim 7, wherein said control means comprises:

a reference oscillator for generating a fixed-frequency oscillator signal of a frequency equal to the frequency of said burst and said interference component signals;

a gate enabled by said reproduced first gate signal sequence to gate said fixed-frequency oscillation signal into a burst-mode reference signal; and means responsive to said reference signal for controlling in frequency and phase said burst and said interference components to produce said burst and said interference component signals.

9. A receiver as claimed in claim 7, wherein said control means comprises:

means responsive to said reproduced first gate signal sequence for converting said burst components and said interference components to a first and a second continuous-mode component signal substantially equal in frequency to each other;

a reference oscillator for producing a continuous-mode reference signal of a frequency equal to the frequency of said burst and said interference component signals; and means responsive to said reference signal for controlling in frequency and phase said first and second continuous-mode component signals to produce said burst and said interference component signals.

10. A receiver as claimed in claim 4, said interference signal being introduced from that portion of said first transmission channel into that portion of said second transmission channel which portions are interposed between said repeater means and said receiver, wherein said gate signal producing means comprises:

means responsive to said received first and second transmission signals for producing first and second components corresponding to the received first and second carrier signal burst sequences, respectively, and being approximately equal in frequency and phase to each other; and means responsive to said first and second components for producing said reproduced gate signal sequences.

11. A receiver as claimed in claim 10, wherein said component signal producing means comprises:

an oscillator for producing an oscillation signal;

burst and interference component producing means responsive to said received first and second transmission signals, said received interference signal, said oscillation signal, and the reproduced first gate signal sequence for producing burst components and interference components corrsponding to said received first carrier signal burst sequence and said received interference signal, respectively, and being of a substantially common frequency; and control means responsive to said reproduced first gate signal sequence for controlling in frequency and phase said burst components and said interference components to produce said burst and said interference component signals.

12. A receiver as claimed in claim 11, wherein said burst and interference component producing means comprises:

means for frequency converting said received first and second transmission signals and said received interference signal by the use of said oscillation signal to produce in burst mode converted transmission signals and a converted interference signal, respectively, said converted transmission signals and said converted interference signal being of said substantially common frequency; and means responsive to said reproduced first gate signal sequence and said converted transmission and interference signals for producing said burst components and said interference components.

13. A receiver as claimed in claim 12, wherein said control means comprises:

a reference oscillator for generating a fixed-frequency oscillation signal of a frequency equal to the frequency of said burst and said interference component signals;

a gate enabled by said reproduced first gate signal sequence to gate said fixed-frequency oscillation signal into a burst-mode reference signal; and means responsive to said reference signal for controlling in frequency and phase said burst and said interference components to produce said burst and said interference component signals.

14. A receiver as claimed in claim 12, wherein said control means comprises:

means responsive to said reproduced first gate signal sequence for converting said burst components and said interference components to a first and a second continuous-mode component signal substantially equal in frequency to each other;

a reference oscillator for producing a continuous-mode reference signal of a frequency equal to the frequency of said burst and said interference component signals; and means responsive to said reference signal for controlling in frequency and phase said first and second continuous-mode component signals to produce said burst and said interference component signals.

* * * * *

UNITED STATES PATENT AND TRADEMARK OFFICE
CERTIFICATE OF CORRECTION

PATENT NO. : 4,207,521
DATED : June 10, 1980
INVENTOR(S) : MASAMI TAKADA

It is certified that error appears in the above-identified patent and that said Letters Patent are hereby corrected as shown below:

[30] Foreign Application Priority Data
September 7, 1976 Japan 51-107551

Signed and Sealed this

Eighteenth Day of November 198

[SEAL]

Attest:

SIDNEY A. DIAMOND

Attesting Officer

Commissioner of Patents and Trademarks